Patented May 6, 1947

UNITED STATES PATENT OFFICE 2,420,255

MANUFACTURE OF ADDITION COMPOUNDS OF LACTIC ACID SALTS WITH ACETIC ACID

Ritchie Hart Lock, Chigwell, England, assignor to Howards & Sons Limited, Ilford, England No Drawing. Application June 23, 1945, Serial No. 601,353. In Great Britain June 22, 1944

11 Claims. (Cl. 260—535)

I have found that alkaline earth metal salts of lactic acid form with acetic acid addition compounds which may be used, among other purposes, as a convenient solid form of acetic acid. They may be used, for example, for incorporation in baking powders.

The invention provides a process for making the aforesaid addition compounds, in which a mixture of the lactic acid salt and a quantity of acetic acid in excess of that which enters into combination is heated at a temperature not exceeding the boiling point of the mixture under atmospheric pressure, and the resulting addition compound is isolated by separating it from the excess of acetic acid.

Calcium lactate is advantageously used as the earth metal salt of lactic acid.

The presence of moderate quantities of water is not detrimental to the formation of the addition compounds, so that alkaline earth metal lactates containing water of crystallisation or moderately dilute acetic acid may be used. However, the greater the quantity of water present in the system the smaller is the proportion of acetic acid which enters into combination. In general, it is therefore advantageous to use the acetic acid in the form of glacial acetic acid and/or to use the alkaline earth metal lactates in anhydrous form.

The mixture should be heated at a temperature not exceeding its boiling point under atmospheric pressure, and advantageously at 40–50° C.

It is possible to prepare, for example, from calcium lactate monohydrate and calcium lactate pentahydrate compounds containing 2 mols and 1 mol of acetic acid, respectively, per mol of calcium lactate, and having the probable formulae

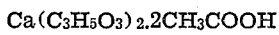

and

The process may be carried out by dissolving the lactic acid salt in an excess of acetic acid at a temperature hereinbefore indicated, and isolating the addition compound by separating it from the excess of acetic acid, for example, by crystallisation or evaporation of the excess of acetic acid, at a low temperature.

The following examples illustrate the invention:

Example 1

236 grams of calcium lactate monohydrate are dissolved in 500 cc. of glacial acetic acid with gentle heating at about 40–50° C. When dissolution is complete, the whole is allowed to cool and crystallisation occurs. The crystals are separated by filtration, and dried in an oven at 40–45° C. in a gentle current of air to remove adherent acetic acid. After cooling, the crystals are crushed to form a white friable powder, which by titration is found to contain 32.5 per cent of acetic acid. The product has the probable formula $Ca(C_3H_5O_3)_2.2CH_3COOH$.

Example 2

308 grams of calcium lactate pentahydrate (B. P.) are dissolved in 500 cc. of glacial acetic acid with gentle heating at about 40–50° C. When dissolution is complete, the excess of acetic acid is removed by evaporation by passing a current of air through or over the mixture for a period of two days, the temperature being at first maintained at 40° C. and later at 80° C. The solid product which remains is pulverised in a mortar, and is found by titration to contain 14.4 per cent of acetic acid. It has the probable formula $Ca(C_3H_5O_3)_2.CH_3COOH.5H_2O$.

I claim:

1. A process for making an addition compound of a lactic acid salt with acetic acid, which comprises heating a mixture of an alkaline earth metal salt of lactic acid with a quantity of acetic acid in excess of that which enters into combination at a temperature not exceeding the boiling point of the mixture under atmospheric pressure, and isolating the addition compound by separating it from the excess of acetic acid.

2. A process as claimed in claim 1, wherein glacial acetic acid is used.

3. A process for making an addition compound of calcium lactate with acetic acid, which comprises heating a mixture of calcium lactate with a quantity of acetic acid in excess of that which enters into combination at a temperature not exceeding the boiling point of the mixture under atmospheric pressure, and isolating the addition compound by separating it from the excess of acetic acid.

4. A process as claimed in claim 3, wherein glacial acetic acid is used.

5. A process for making an addition compound of a lactic acid salt with acetic acid, which comprises dissolving an alkaline earth metal salt of lactic acid in a quantity of acetic acid in excess of that which enters into combination by heating the mixture at a temperature not exceeding its boiling point under atmospheric pressure, and isolating the addition compound by crystallization.

6. A process for making an addition compound of a lactic acid salt with acetic acid, which comprises dissolving an alkaline earth metal salt of lactic acid in a quantity of acetic acid in excess of that which enters into combination by heating the mixture at a temperature not exceeding its boiling point under atmospheric pressure, and isolating the addition compound by evaporation of the excess of acetic acid at a temperature below the decomposition point of the addition compound.

7. A process for making an addition compound of calcium lactate with acetic acid, which comprises dissolving 1 mol of calcium lactate monohydrate in a quantity of glacial acetic acid exceeding 2 mols at a temperature of about 40–50 degrees C., cooling the resulting solution to cause the addition compound to crystallize, and separating and drying the crystals in a current of air at a temperature below the decomposition point of the addition compound.

8. A process for making an addition compound of calcium lactate with acetic acid, which comprises dissolving 1 mol of calcium lactate pentahydrate in a quantity of glacial acetic acid exceeding 1 mol at a temperature of about 40–50 degrees C., and isolating the addition compound by removing the excess of acetic acid from the resulting solution by means of a current of air at a temperature below the decomposition point of the addition compound.

9. An addition compound of an alkaline earth metal lactate with acetic acid.

10. An addition compound of calcium lactate with acetic acid, containing 2 mols of acetic acid per mol of calcium lactate.

11. An addition compound of calcium lactate with acetic acid, containing 1 mol of acetic acid per mol of calcium lactate.

RITCHIE HART LOCK.

REFERENCES CITED

The following references are of record in the file of this patent:

FOREIGN PATENTS

| Number | Country | Date |
|---|---|---|
| 346,521 | German | Jan. 2, 1922 |
| 414,171 | German | May 25, 1925 |
| 229,192 | German | Feb. 19, 1925 |

OTHER REFERENCES

Villiers et al., Beilstein, vol. II, (4th ed., 1920), p. 111.